(12) United States Patent
Stonehocker et al.

(10) Patent No.: US 9,330,669 B2
(45) Date of Patent: *May 3, 2016

(54) SYSTEM AND METHOD FOR PERFORMING DUAL MODE SPEECH RECOGNITION

(71) Applicant: SoundHound, Inc., Santa Clara, CA (US)

(72) Inventors: Timothy P. Stonehocker, Sunnyvale, CA (US); Keyvan Mohajer, Los Gatos, CA (US); Bernard Mont-Reynaud, Sunnyvale, CA (US)

(73) Assignee: SoundHound, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/621,024

(22) Filed: Feb. 12, 2015

(65) Prior Publication Data

US 2015/0154959 A1    Jun. 4, 2015

Related U.S. Application Data

(63) Continuation of application No. 13/530,101, filed on Jun. 21, 2012, now Pat. No. 8,972,263.

(60) Provisional application No. 61/561,393, filed on Nov. 18, 2011.

(51) Int. Cl.
| G10L 15/04 | (2013.01) |
| G10L 15/00 | (2013.01) |
| G10L 15/30 | (2013.01) |
| G10L 15/08 | (2006.01) |
| G10L 15/26 | (2006.01) |
| G10L 15/34 | (2013.01) |

(52) U.S. Cl.
CPC ............... *G10L 15/30* (2013.01); *G10L 15/08* (2013.01); *G10L 15/265* (2013.01); *G10L 15/34* (2013.01); *G10L 2015/081* (2013.01)

(58) Field of Classification Search
USPC .................................. 704/231–257, 270–275
See application file for complete search history.

(56) References Cited

U.S. PATENT DOCUMENTS

| 6,327,568 | B1 | 12/2001 | Joost |
| 6,408,272 | B1 | 6/2002 | White et al. |
| 6,456,975 | B1 | 9/2002 | Chang |
| 6,487,534 | B1 | 11/2002 | Thelen et al. |
| 8,972,263 | B2 * | 3/2015 | Stonehocker ........... G10L 15/30 704/201 |
| 2006/0190268 | A1 | 8/2006 | Wang |
| 2010/0106497 | A1 | 4/2010 | Phillips |
| 2011/0015928 | A1 | 1/2011 | Odell et al. |

* cited by examiner

*Primary Examiner* — Jesse Pullias
(74) *Attorney, Agent, or Firm* — Haynes Beffel & Wolfeld LLP; Ernest J. Beffel, Jr.

(57) ABSTRACT

A system and method is presented for performing dual mode speech recognition, employing a local recognition module on a mobile device and a remote recognition engine on a server device. The system accepts a spoken query from a user, and both the local recognition module and the remote recognition engine perform speech recognition operations on the query, returning a transcription and confidence score, subject to a latency cutoff time. If both sources successfully transcribe the query, then the system accepts the result having the higher confidence score. If only one source succeeds, then that result is accepted. In either case, if the remote recognition engine does succeed in transcribing the query, then a client vocabulary is updated if the remote system result includes information not present in the client vocabulary.

17 Claims, 3 Drawing Sheets

SYSTEM AND METHOD FOR PERFORMING DUAL MODE SPEECH RECOGNITION

CROSS-REFERENCE TO RELATED APPLICATIONS

This application is a continuation of U.S. application Ser. No. 13/530,101, entitled "System and Method for Performing Dual Mode Speech Recognition," filed on 21 Jun. 2012, which claims the benefit of U.S. Provisional Application No. 61/561,393, entitled "Dual Mode Speech Recognition with Caching," filed 18 Nov. 2011, both of which application are incorporated by reference herein in its entirety.

BACKGROUND

This application deals generally with the field of automated speech recognition (ASR) and more specifically with ASR systems embedded in mobile devices.

A number of mobile devices, such as smart phones, include embedded ASR systems. A typical application for such systems is voice control for operating the telephone (dialing) or for looking up various kinds of information (search). Such ASR systems are capable running in two modes, a local mode that functions entirely on the mobile device, and a remote mode in which processing is accomplished over a network connection to a server. As its name suggests, the local mode relies on embedded software on the client device to perform the entire speech recognition task. The remote mode (also referred to as server-based or cloud-based mode) transmits a recognition request to a server, which performs the task and sends results back to the mobile device. Even so, subtasks such as feature extraction and the calculation of acoustic scores can be accomplished on the client device; the latter architecture is sometimes referred to as distributed recognition.

Local mode ASR offers advantages of speed and responsiveness, but a local system is inherently limited in processing and data storage capabilities, both of which may impact the quality of the speech recognition result. In contrast, server-based recognition offers full-featured results, but depends upon a fast, reliable communications link, which may not be always available. In some instances, achieving the high quality of server-based speech recognition comes at the cost of unacceptable delays.

Thus, a need exists for an ASR system for mobile devices that combines the responsiveness of a local system with the quality of a server-based system.

SUMMARY

An aspect of the present disclosure is a method for performing dual mode speech recognition. That method includes receiving a spoken query from a user. The spoken query is process, which includes a number of operations, such as sending the spoken query to a local recognition system on a mobile device and also transmitting the spoken query to a remote recognition system via a communications link. The method also sets a latency timer to a preset timeout value. In the event that the spoken query is not recognized by either the local recognition system or the remote recognition system within the latency timer period, the method chooses the recognition failure as a final result. If, however, the spoken query is recognized by both the local recognition system and the remote recognition system within the latency timer period, the method obtains a recognition result and an associated recognition score from both the local recognition system and the remote recognition system, and it then chooses the final result as the recognition result associated with the higher recognition score. In the event that the spoken query is recognized by only the local recognition within the latency timer period, the method proceeds to obtain a recognition result and associated score from the local recognition system, choosing the local recognition result as the final result. Conversely, if the spoken query is recognized by only the remote recognition system within the latency timer period, the method obtains a recognition result and associated score from the remote recognition system and chooses the remote recognition result as the final result. After the final result is chosen, the method takes action on behalf of the user based on the final result. In the event that the spoken query is recognized by the remote recognition system within the latency timer period, then upon determining that the remote recognition result contains vocabulary information not contained within a client vocabulary maintained within the local recognition system, the method requests that the remote recognition system update the client vocabulary.

Another aspect of the disclosure is a system for dual mode speech recognition. The system comprises a local recognition system housed in a mobile device, and that system includes a communication module configured for communicating with a user and other devices; a recognition module configured for recognizing and transcribing audio content; a control module; a client vocabulary configured to describe the words or phrases available to the recognition module; and a vocabulary updater module configured for updating the client vocabulary. The dual mode speech recognition system also comprises a remote recognition system housed in a server, which includes a recognition engine configured for recognizing and transcribing audio content; and a vocabulary download module configured for providing updates to the vocabulary update module.

BRIEF DESCRIPTION OF THE DRAWINGS

The drawing figures described below set out and illustrate a number of exemplary embodiments of the disclosure. Throughout the drawings, like reference numerals refer to identical or functionally similar elements. The drawings are illustrative in nature and are not drawn to scale.

DETAILED DESCRIPTION

The following detailed description is made with reference to the figures. Exemplary embodiments are described to illustrate the subject matter of the disclosure, not to limit its scope, which is defined by the appended claims.

Figure 1A:
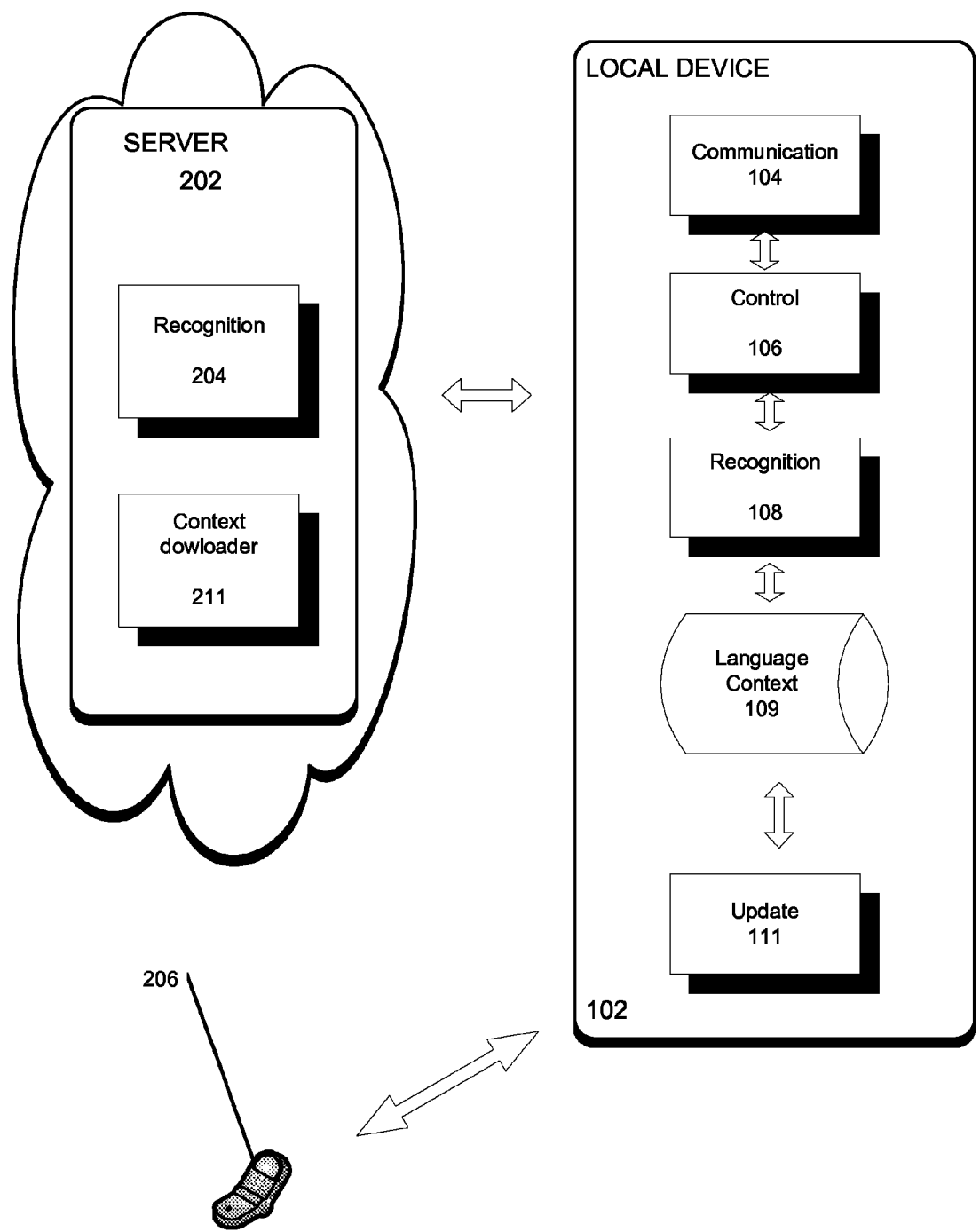
FIG. 1A is a block diagram of a system for identifying speech content, in accordance with the principles of the present disclosure.

FIG. 1A is a block diagram of a system capable of performing dual mode speech recognition according to the present disclosure. The system includes two primary elements: a client device 102 and a server 202. Client device 102 can be embedded in any of a wide range of mobile devices which incorporate some uses of speech recognition. A common example is voice control of a telephone dialing application, featured on various models of Apple Inc.'s iPhone®, or a number of implementations of Google Inc.'s Android® operating system, such as the MotoBlur® smart phones marketed by Motorola Inc. These applications accept telephone dialing commands as well as telephone numbers. Other applications on these and similar devices include mapping applications that accept location names as well as commands such as directions to find a restaurant of a given name, and the like. It will be understood that in this disclosure, client device 102 represents only the speech recognition portion of a mobile device, and not any other part of the functionality of such a system. Any of the wide variety of mobile systems employing some form of speech recognition could make use of embodiments of the present disclosure.

Client device 102 includes a communication module 104, a control module 106, a recognition module 108 driven by language context 109, and an update module 111. Communication module 104 sends and receives messages to/from the outside world, such as messages to/from the server, and issues commands to various parts of the host mobile device, such as, for example, a command to dial a particular telephone number. Control module 106 controls the operations of client device 102, including data flow within the device as well as the communication interfaces to the host mobile device and the outside world. Recognition module 108 performs speech recognition functions, accepting audio input for a spoken query and producing as output results including the corresponding text. The language context 109 provides a description of the language accepted by the recognition module 108, as explained more fully below. Update module 111 supports the adaptation of language context 109 to changing circumstances in the dialog.

Proprietary or Open Source embodiments exist for mobile recognition module 108; for example, SphinxTiny, is an open source adaptation of Sphinx 3.x for the constraints of a mobile environment. Two general points should be noted about recognition module 108. First, it will be readily understood that constraints on processor power, code size and supporting data sizes limit the coverage and accuracy of a speech recognition system hosted in a mobile device, compared to full-scale speech recognition systems that are generally extensive software structures with large vocabularies, depending on large data storage capabilities. Mobile systems with small vocabularies produce very good results when the spoken input uses the expected vocabulary, but cannot generally match with the results of large server systems, particularly in terms of coverage.

Second, the results from speech recognition by module 108 include two parts: a transcription, which is its best estimate for the text of what the query said; and a score which measures its confidence in the accuracy of the recognition result. Confidence scoring is well-known in the art; the details of how such scores are typically generated are not essential here. More important is the fact that scores generated in the same manner from the same query can be compared to measure relative confidence between two transcription alternatives. U.S. Pat. No. 7,899,669 provides a recent example of a method that depends on performing such score comparisons.

In the illustrated embodiment, language context 109 consists of a set of words with their descriptions as text, and in terms of smaller components. The specific form of the vocabulary data structures depends on the specific embodiment of the recognition module 108. Some embodiments include phonetic strings (one or more per pronunciation of the word) and phonetic lattices (one per word, more compactly encoding the set of all pronunciations). Other embodiments included other vocabulary elements. Those of ordinary skill in the art will understand the range of variations that may fall within this category without altering the scope of the invention. The language context 109 describes the words or phrases available to the recognition module 108 for transcribing a query.

Figure 1B:
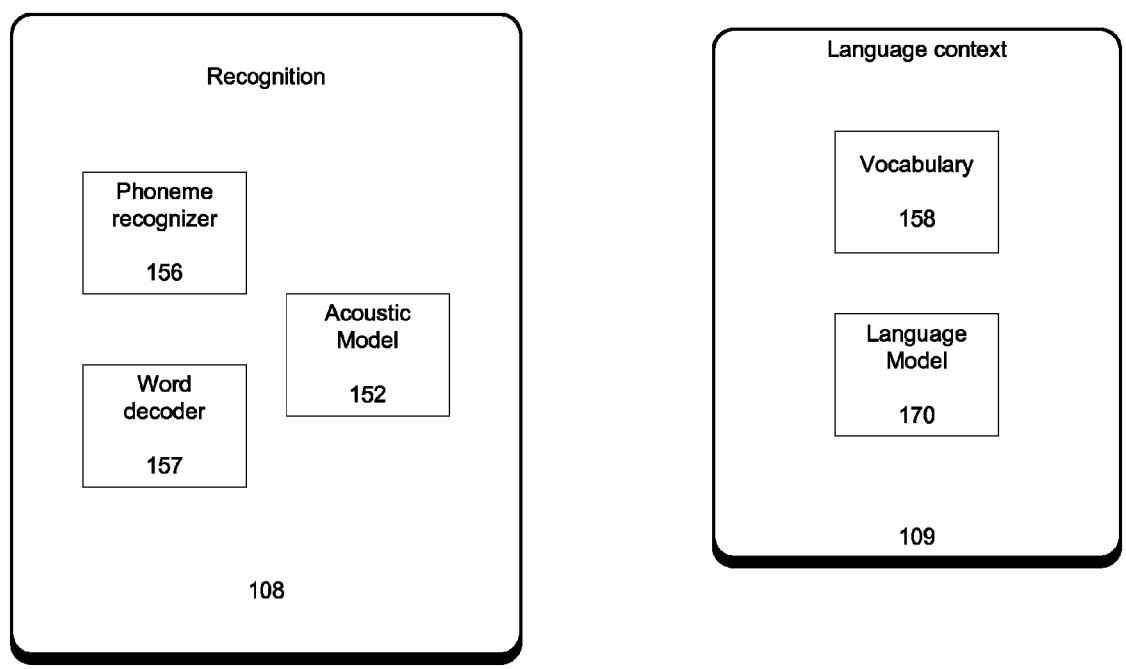
FIG. 1B is a block diagram of the recognition module, as employed in the system of FIG. 1A, in accordance with the principles of the present disclosure.

FIG. 1B sets out an exemplary embodiment of a two-layer recognition module 108 that uses ASR techniques known in the art, supported with language context 109. Recognition module 108 includes a phoneme recognizer module 156 and a word decoder module 157. A given block of speech is processed by phoneme recognizer 156 that makes use of fixed acoustic models such as acoustic model 152 and creates as output a compact phoneme network. The phoneme network is passed as input to word decoder 157, which uses the language context 109 to create a transcription and associated confidence score.

The language context 109 includes two modules, a vocabulary 158 and a language model 170. Vocabulary 158 is set of words or phrases. It should be noted that a phrase (that is, a sequence of words such as "San Francisco" that is essentially used as a single word) will be treated as a word and be a vocabulary entry. As used below, "word" indicates "word or phrase." Language model 170 consists of a set of constraints on word sequences. Language constraints are expressed differently in different embodiments; typical embodiments are N-grams and grammars.

Initially, language context 109 contains only a pre-determined vocabulary. As more recognitions are performed, as described below, update module 111 performs an adaptation of the client vocabulary, whereby one or more words are being added to the language context 109, and other words might be removed to make room for the new words.

The new words, in a format intended for use by the client recognition module 108, are sent by the server's module 211. The actual extension of the client vocabulary is done by the update module 111. Thereafter, the recognition module 108 will use the expanded vocabulary. The use of an expanded language context 109 may materially improve the response time of the ASR process. Inasmuch as language context 109 stores data for rapid access, this element may be viewed as a vocabulary cache.

In order to add words to the vocabulary, update module 111 may need to perform an additional function. When the available memory resources for client vocabulary data is about to run out, a garbage collection operation will be performed. In one exemplary embodiment, removal of a non-permanent word can be performed on a priority basis. The priority of a non-permanent word may be chosen using heuristic factors such as a word's importance (an assigned priority), how often it is used, or how recently it is used. Alternatively, frequency and recency of use may be combined as a word frequency amortized over time.

Another embodiment may map words to topics. The word to topic association can be downloaded by the update module 111 when it expands the language context 109. In this case, word desirability can be based on topic desirability, using importance and frequency data for topics instead of words.

Server 202 designates a system operating remotely, in conjunction with client device 102, to jointly support the desired speech recognition functionality; communications between the two may use one or more networks including the cellular telephone system, wireless networks, and the Internet. Any device fitting the term "server" as that term is generally known in the art can be employed as server 202. The primary requirement here is robust computing power, supported by extensive data storage capacity. Those of skill in the art will recognize the minimum requirements for such a device.

It should further be noted that the present disclosure can be implemented using a number of commercially available speech recognition systems. The feature set out below do not depend upon the operation of any particular software, but rather the features set out here supplement the operation of any speech recognition architecture.

Recognition engine 204 can be any speech recognition system, proprietary or otherwise. In addition to the examples mentioned above; those in the art will appreciate the potential for the Sphinx 3 system or one of its derivatives, as disclosed in the Wikipedia webpage for "CMU Sphinx. As noted above, recognition engine 204 is a robust, full-featured speech recognition engine, capable of sophisticated, reliable, and accurate speech recognition; it offers considerable advantages in coverage and accuracy when compared with speech recognition module 108. The vocabulary and language data available for local recognition by embedded recognition module 108 is much more limited. In some embodiments, recognition engine 202 and embedded recognition module 108 will be close algorithmic variants of each other, and thus highly compatible. A weaker compatibility is also an option, so long as the scores generated by the two systems are comparable, perhaps after some scaling. One must be able to compare a score generated by recognition module 108 with a score generated by recognition engine 204, enabling the client control module 106 to make a relative confidence judgment between the results of the recognition engine 204 and those of recognition module 108.

Server 202 and client device 102 are connected by way of one or more electronic communications networks. The connection path can be short and reliable, such as a Local Area Network. In other embodiments the connection between client device 102 and server 202 may have delays, or it may be available only intermittently.

Figure 2:
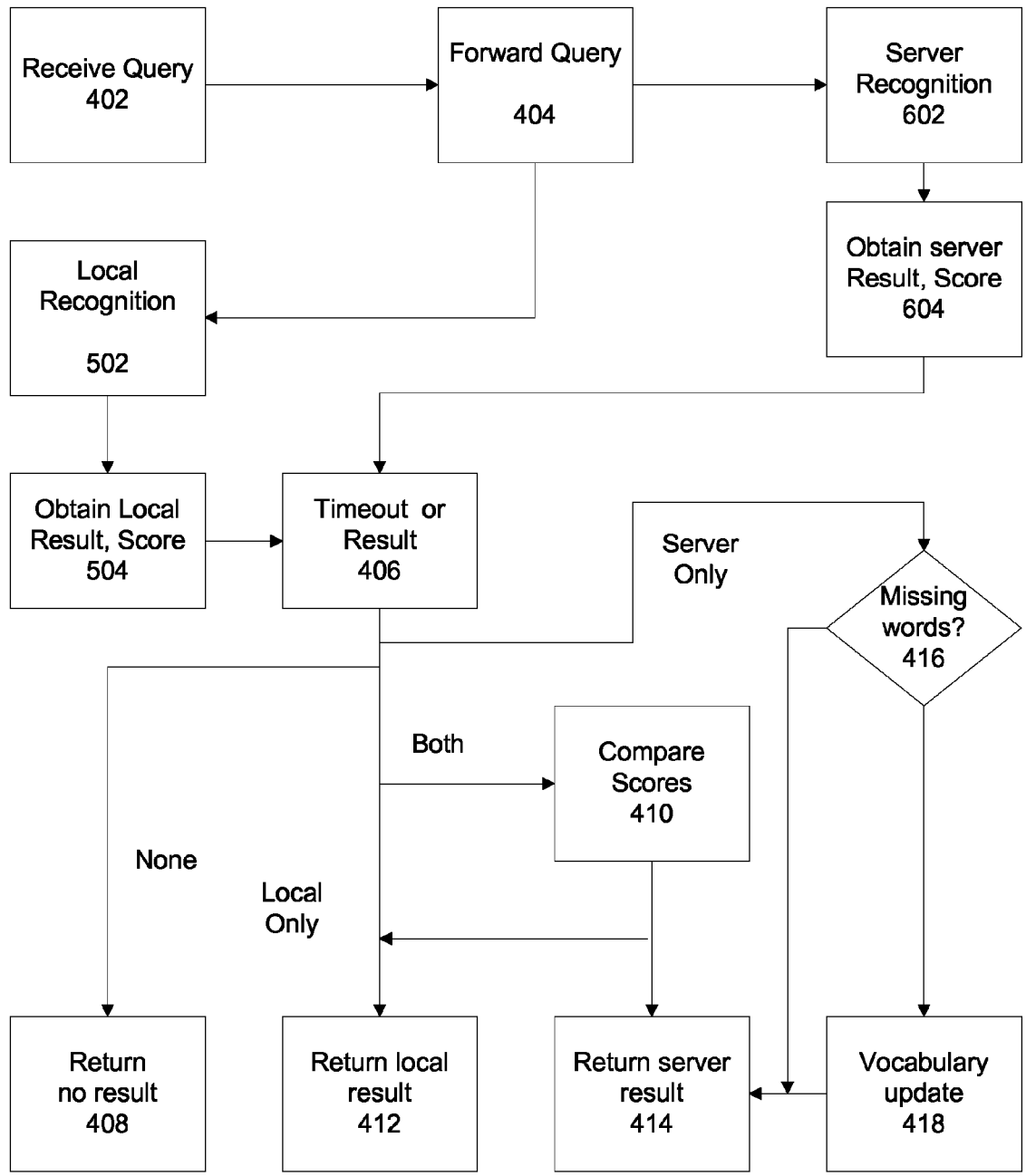
FIG. 2 is a flowchart, setting out an embodiment of a process in accordance with the present disclosure.

FIG. 2 sets out a flowchart for a method disclosed in connection with the present disclosure. In general, the method begins with the receipt of a communication including a spoken query from a user and terminates by providing a text output (or transcription) that matches the content of the spoken query. The following discussion will include hardware references to specific elements of the exemplary embodiment of FIG. 1A, but it should be understood that those references do not limit the apparatus to be used in connection with the method of FIG. 2 in any way.

Method 400 begins by receiving a spoken query at step 402. The software in the host mobile device typically receives the spoken query directly from the user, speaking into the device's microphone. The user's spoken query is transmitted to a module such as communications module 104 (FIG. 1A) and routed to the control module 106 which sends it to the speech recognition module 108.

To perform the recognition both locally and remotely, the client forwards the spoken query at step 404 to both client device 102 and server 202 as part of a recognition request. Each system will return a transcription result with a certain score and latency. Note that the result text may be empty, indicating the absence of a result, indicating that the spoken query was not recognized.

In dual mode recognition, the client device 102 waits for a certain time for results from both the client's recognition module 108 and server and the server's recognition engine 204. A timeout is chosen, as a latency that seems tolerable to the user, given the realities of the anticipated communication systems and networks. In one embodiment, the latency is chosen as 3 seconds. If both results are obtained within the latency threshold, the system will choose the one with the better score. Otherwise, the control module will choose the first result it receives. In either case, the chosen result will be returned as the basis for further processing of the response given to the user.

Simultaneously, with the performance of a local recognition operation in step 502, recognition engine 204 also performs a recognition operation at step 602. These two steps are completely asynchronous, and both operations return independent results to controller 106, at step 604. It is generally expected that the remote recognition result will be preferable to the local recognition result, the question being whether the remote recognition result can be produced with acceptable responsiveness.

At step 406, the system waits for a recognition result to be received from the server, or for the timeout to expire, whichever occurs first. At the end of the latency period, four possible outcomes exist. Results may have been received from both the server and the client; from the client only; from the server only; or from neither.

In the last eventuality, where no result is returned before the latency timeout, the process shifts to step 408, and the user is notified that no recognition was possible. Similarly, the cases of receiving the local result only or the server result only call for returning either the local result at step 412 or the server result at step 414, respectively. The controller 106 compares the scores of two results and chooses the higher score as the successful recognition. Control then passes to step 412 if the local result score is higher, or to 414 if the server result score is higher. When a result is available from the server but not from the client recognition module, additional analysis and possible action is required beyond returning the result. It should be noted at the outset that some server systems may return an "empty" or "null" result upon failure to achieve a recognition. Those of skill in the art will understand that this situation may be dealt with in a number of ways. In one embodiment, the controller may determine whether a result was obtained from the local recognition module, and if so, it may reclassify the current outcome as either "No result" (if the local recognition module was unsuccessful) or as "Local result only" if a local result was achieved.

If the situation actually is classified as "server only", the process first proceeds to step 416, to determine whether the server's transcription contains any word or words that may be missing from the language context 109. If such words are found, the client at step 418 issues a request to the server, employing update module 111, to send descriptions of the missing words. After that request, or in the event that no missing words were found, control passes to step 414, where the server result is returned. The server recognition engine 204 may apply contextual analysis or rules, employing the various linguistic models that may be incorporated into that engine, to identify useful responses to update requests. Upon seeing the missing word "Tuesday," for example, it might send all the days of the week and months of the year. Upon seeing the word "rain" or "temperature" it can send a set of words that relate to the topic of weather.

CONCLUSION

The specification has described a method for performing dual mode speech recognition using both a client-based and server-based recognizers. Those of skill in the art will perceive a number of variations possible with the system and method set out above. These and other variations are possible within the scope of the claimed invention, which scope is defined solely by the claims set out below.

The invention claimed is:

1. A method for performing dual mode speech recognition, comprising:
   receiving a spoken query from a user;
   processing the spoken query, including:
      sending the spoken query to a local recognition system on a mobile device;
      transmitting the spoken query to a remote recognition system via a communications link; and
      setting a latency timer period to a preset timeout value;
   in the event that the spoken query is not recognized by either the local recognition system or the remote recognition system within the latency timer period, choosing recognition failure as a final result;
   in the event that the spoken query is recognized by both the local recognition system and the remote recognition system within the latency timer period, obtaining a recognition result and associated recognition score from both the local recognition system and the remote recognition system and choosing the recognition result associated with the higher recognition score as the final result;
   in the event that the spoken query is recognized by only the local recognition within the latency timer period, obtaining a recognition result from the local recognition system, and choosing the local recognition result as the final result;
   in the event that the spoken query is recognized by only the remote recognition system within the latency timer period, obtaining a recognition result from the remote recognition system, and choosing the remote recognition result as the final result;
   taking action on behalf of the user based on the final result.

2. The method of claim 1, wherein:
   the local recognition system maintains a client vocabulary programmed to describe words or phrases available to be recognized.

3. The method of claim 2, further comprising:
   determining that the remote recognition system contains vocabulary information that is not contained in the client vocabulary of the local recognition system.

4. The method of claim 2, further comprising:
   receiving vocabulary information updates from the remote recognition system; and
   updating the client vocabulary of the local recognition system with the received vocabulary information.

5. The method of claim 2, wherein one or more words from the client vocabulary are assigned at least one of:
   a frequency value that indicates how often the word is used; and
   a recency value that indicates when the word was last used.

6. The method of claim 5, further comprising removing a word from the client vocabulary based at least on a frequency value or a recency value.

7. The method of claim 1, further comprising:
   receiving from the local recognition system and the remote recognition system a transcription that is an estimate for the text of what the spoken query said.

8. The method of claim 7, wherein the recognition score received from the local recognition system and remote recognition system measures the confidence in the accuracy of the respective transcription.

9. A system for dual mode speech recognition, comprising:
   a local recognition system housed in a mobile device, including:
      a communication module programmed to communicate with a user and other devices and for receiving a spoken query;
      a recognition module programmed to recognize and transcribe audio content;
      a control module; and
      a client vocabulary programmed to describe words or phrases available to the recognition module;
   a remote recognition system housed in a server, including:
      a recognition engine programmed to recognize and transcribe audio content;
      a vocabulary download module programmed to provide updates to the vocabulary update module;
      a latency timer;
      wherein the control module of the local recognition system is programmed to:
         set a latency timer period to a preset timeout value; and
         in the event that the spoken query is recognized by both the local recognition system and the remote recognition system within the latency timer period, obtain a recognition result and associated recognition score from both the local recognition system and the remote recognition system, and choosing the final result as the recognition result associated with the higher recognition score.

10. The system of claim 9, wherein the control module of the local recognition system is further programmed to send the spoken query to the recognition module of the local recognition system and the remote recognition system.

11. The system of claim 9, wherein the control module of the local recognition system is programmed to:
    in the event that the spoken query is recognized by only the local recognition within the latency timer period, obtaining a recognition result and associated score from the local recognition system; and choosing the local recognition result as the final result; and
    in the event that the spoken query is recognized by only the remote recognition system within the latency timer period, obtaining a recognition result and associated score from the remote recognition system; and choosing the remote recognition result as the final result.

12. The system of claim 9, further comprising a vocabulary updater module that is programmed to remove one or more words from the client vocabulary.

13. The system of claim 12, wherein one or more words from the client vocabulary are assigned a priority value that indicates the word's importance, and the vocabulary updater module is further programmed to remove a word selected from the client vocabulary based at least on the priority assigned the selected word.

14. The system of claim 12, wherein one or more words from the client vocabulary are assigned a frequency value that indicates how often the word is used and a recency value that indicates when the word was last used, and the client vocabulary updater module is further programmed to remove a word selected from the client vocabulary based at least on the frequency value or recency value associated with the selected word.

15. The system of claim 9, wherein the recognition module of the local recognition system and the recognition module of the remote recognition system are each programmed to output:
    a transcription that is an estimate for the text of what the spoken query said; and
    a score associated with the respective transcription that measures confidence in the accuracy of the associated transcription.

16. A system for dual mode speech recognition, comprising:
- a latency timer;
- a local recognition system housed in a mobile device, including:
  - a communication module programmed to communicate with a user and other devices and to receive a spoken query;
  - a recognition module programmed to recognize and transcribe audio content;
  - a control module;
  - a client vocabulary programmed to describe words or phrases available to the recognition module; and
- a remote recognition system housed in a server, including:
  - a recognition engine programmed to recognize and transcribe audio content;
  - a vocabulary download module programmed to provide updates to the vocabulary update module;
- wherein the control module of the local recognition system is programmed to:
  - set a latency timer period to a predefined value;
  - in the event that the spoken query is recognized by both the local recognition system and the remote recognition system within the latency timer period, obtain a recognition result and associated recognition score from both the local recognition system and the remote recognition system, and choosing the final result as the recognition result associated with the higher recognition score;
  - in the event that the spoken query is recognized by only the local recognition within the latency timer period, obtaining a recognition result and associated score from the local recognition system; and choosing the local recognition result as the final result; and
  - in the event that the spoken query is recognized by only the remote recognition system within the latency timer period, obtaining a recognition result and associated score from the remote recognition system; and choosing the remote recognition result as the final result.

17. A method for performing dual mode speech recognition, comprising:
- receiving a spoken query from a user;
- processing the spoken query, including:
  - sending the spoken query to a local recognition system on a mobile device;
  - transmitting the spoken query to a remote recognition system via a communications link; and
  - setting a latency timer period to a preset timeout value;
- in the event that the spoken query is recognized by both the local recognition system and the remote recognition system within the latency timer period, obtaining a recognition result and associated recognition score from both the local recognition system and the remote recognition system, and choosing the final result as the recognition result associated with the higher recognition score; and
- in the event that the spoken query is recognized by the remote recognition system within the latency timer period, upon determining that the remote recognition result contains vocabulary information not contained within a client vocabulary maintained within the local recognition system, requesting that the remote recognition system update the client vocabulary.

* * * * *